United States Patent Office 2,953,016
Patented Sept. 20, 1960

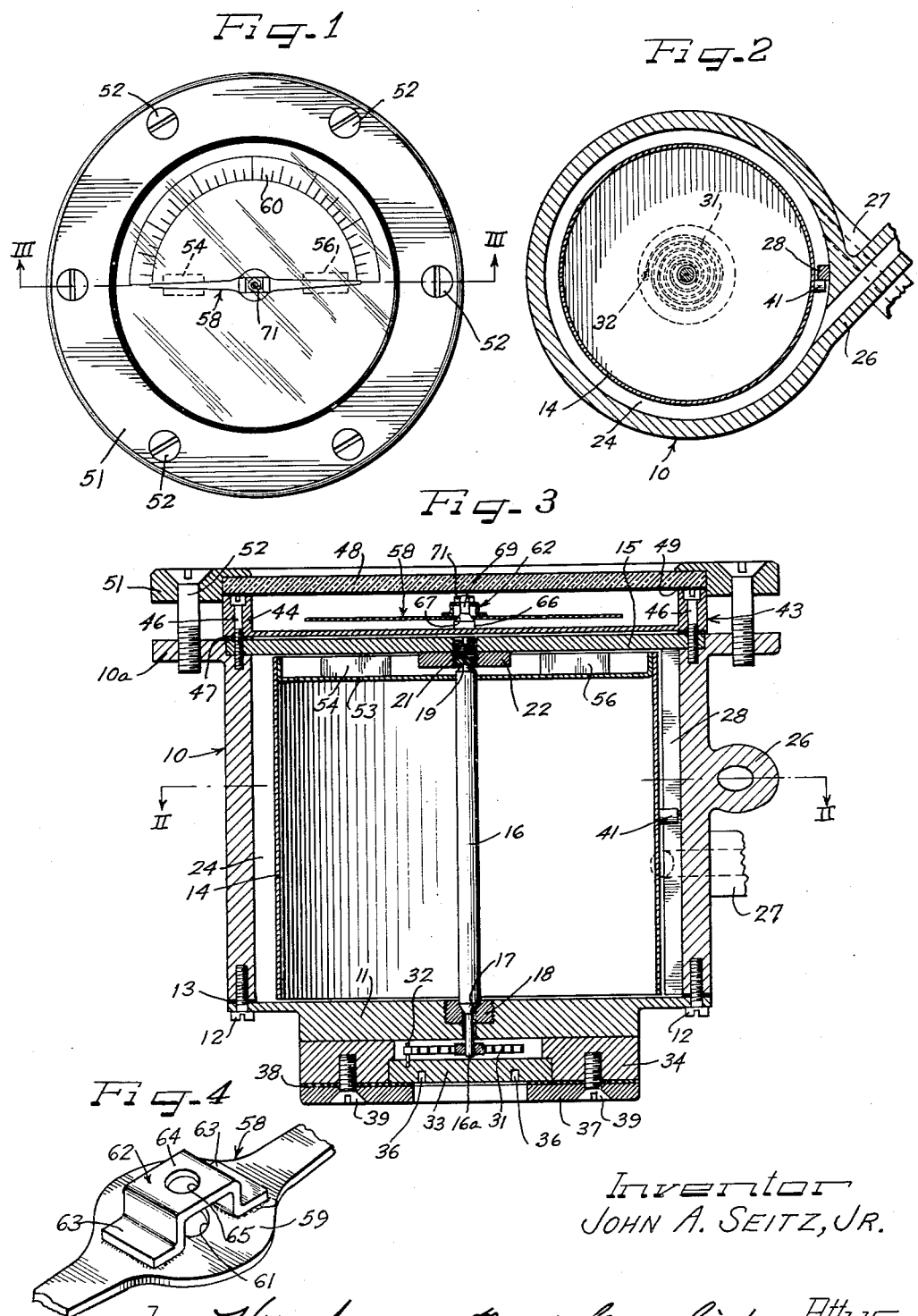

2,953,016

VISCOSIMETER

John A. Seitz, Jr., Chicago, Ill., assignor of fifty percent to Joseph C. Miner, Battle Creek, Mich.

Filed June 20, 1956, Ser. No. 592,541

2 Claims. (Cl. 73—60)

The present invention relates to improvements in apparatus for measuring viscosity of fluids, particularly of normally viscous fluids such as oil.

Viscosity measurement is usually done on a periodic basis. In one of the most common types of viscosity measuring instruments, the sample to be tested is introduced into a vessel to a predetermined volume, the vessel being provided with a small orifice normally closed by a quick acting valve. The valve is opened during the test and the contents of the vessel flow by virtue of the head of liquid present in the vessel into a calibrated receiver. The time required for the sample to discharge a predetermined volume is measured and this time measurement is then converted into a viscosity reading.

In another type of apparatus, the sample is introduced into a rotating cylindrical container in which is suspended a light, hollow cylinder, the cylinder being pendantly supported on a thin torsion wire. The relative movement between the cylinder and the container causes the liquid in the container to exert a torque on the suspended cylinder. The coefficient of viscosity is determined from the physical constants of the cylinders, the rate of rotation of the outer cylinder, the torsional properties of the suspending wire, and the angle of twist.

In both of the apparatus types described, the measurement of viscosity is done only periodically. The apparatus of the present invention provides a continuously operable apparatus which is capable of providing a continuous reading of viscosity. The ability to obtain such a continuous reading is a great advantage when the system is applied to the measurement of viscosity, for example, in a continuously operating oil pipe line or in a manufacturing plant.

An object of the present invention is to provide an improved viscosimeter capable of providing a continuous reading of viscosity.

Another object of the present invention is to provide an improved indicating instrument for measuring viscosity which provides for continuous circulation of the material being tested through the instrument.

Another object of the invention is to provide a viscosimeter in which the sensing mechanism and the indicating mechanism are mechanically independent of each other so that the mechanical frictional losses are eliminated.

The viscosimeter of the present invention operates on the principles of viscous drag. When relative motion occurs between two spaced bodies separated by a continuous layer of liquid, the molecular film on the surface of the moving body tends to drag along the adjacent molecules of the fluid because of intermolecular forces. These forces in the liquid transmit the drag to the next layer of molecules, and ultimately through the whole body of the liquid. A certain amount of slippage occurs in the transfer of the drag through the liquid, and the more viscous the fluid, the less is the slippage. This viscous drag is then transmitted from one surface to the other. It can be demonstrated that the amount of this force depends on the size and the separation of the surfaces, the relative velocity, and the nature of the fluid.

In the viscosimeter of the present invention, there is provided an outer casing and a rotatable drum or rotor mounted coaxially with the outer casing, the outer wall of the rotor being spaced from the inner wall of the casing to provide an annular fluid flow chamber. The liquid to be tested is introduced into and fills this annular chamber under a predetermined constant pressure.

In moving through the annular chamber, the viscous drag provided by the movement of the liquid causes relative rotational movement to occur between the rotor and the casing, and a sensing means is employed to indicate the amount of displacement.

A further description of the present invention will be made in conjunction with the attached sheet of drawings in which:

Figure 1 is a plan view of the viscosimeter;

Figure 2 is a cross-sectional view taken along the line II—II of Figure 3;

Figure 3 is a cross-sectional view taken along the line III—III of Figure 1; and Figure 4 is a fragmentary view in perspective of the indicator employed.

As shown in the drawings:

Reference numeral 10 indicates a hollow cylindrical casing composed of any suitable material such as aluminum or aluminum alloys, magnesium, synthetic resins, or the like, and provided with a bottom closure plate 11. A plurality of circumferentially spaced bolts 12 are received in threaded engagement in the casing 10 and serve to compress a sealing gasket 13 between the casing 10 and the plate 11.

A hollow cylindrical smooth surfaced drum or rotor 14 is mounted for rotation coaxially with the casing 10, the rotor 14 having a rotor shaft 16 extending therethrough. The shaft 16 has a beveled portion 17 near its lower end which is received in thrust bearing relation in a bearing 18 threaded into the plate 11.

A top closure for the casing is provided by a closure plate 15 composed of a non-magnetic material.

The shaft 16 has a tapered upper end 19 received in a needle bearing 21 extending through the plate 15 and secured against the plate by a lock nut 22.

As best seen in Figures 2 and 3, the outer wall of the rotor 14 is spaced from the inner wall of the casing 10 to provide an annular fluid passageway 24 about the rotor 14. An inlet conduit 26 is connected to a constant pressure source of the fluid whose viscosity is to be measured, and the conduit 26 directs the fluid into the passageway 24 tangentially of the rotor 14. An outlet conduit 27 spaced circumferentially and vertically from the inlet conduit 26 also communicates with the passageway 24 to provide for continuous withdrawal of fluid from the passageway 24. A flow dividing bar 28 is secured to the inner wall of the casing 10 between the inlet and outlet to minimize recirculation of the fluid and to minimize eddy currents or turbulence.

As the fluid is introduced through the inlet conduit 26 into the annular passageway 24, movement of the fluid through the annular passageway tends to rotate the rotor 14 with respect to the casing 10. Rotational movement of the rotor is opposed by the action of a torsion spring 31 having its inner end secured to a reduced diameter extension 16a of the rotor shaft 16 and its outer end secured to a pin 32. The latter is secured to an adjusting disk 33 which is rotatably and slidably received in a recess provided in a centrally apertured disk 34 soldered or welded to the plate 11. The disk 33 is provided with spaced recesses 36 adapted to receive a spanner wrench, or other instrument. The disk 33 is normally held tightly against the confining walls of the disk 34 by providing a plate 37 and a sealing gasket or other sealing means 38 to bear against the adjusting disk 33 by the action of a plurality of screws 39. Thus, when it is desired to adjust the tension on the torsion spring 31, the screws 39 are loosened and a spanner wrench is introduced into the recesses 36 to rotate the adjusting disk 33 in the desired direction, thereby changing the tension on the spring 31. When the adjustment has been made, the screws 39 are again tightened and the spring 31 remains in its adjusted position.

The rotor 14 is also provided with a lug 41 which, in the normal position of the instrument with no fluid passing into the chamber 24, is urged against the dividing bar 28 by the action of the torsion spring 31.

The unit described thus far comprises the sensing mechanism of the viscosimeter and, except for the inlet and outlet, provides a hermetically sealed unit which can be attached to a pipeline or the like to give a continuous indication of the viscosity of the fluid passing through the pipe.

The indicating means used in the viscosimeter is mechanically independent of the sensing means. The indicating means is identified generally at numeral 43 and includes an open ended cylindrical casing 44 composed of a non-magnetic material. A plurality of bolts 46 extend through the walls of the casing 44 and secure the indicator housing 43 to the casing 10. A seal ring 47 may be disposed between the indicator casing 43 and the casing 10. The indicator housing 43 is closed by means of a plate 48 composed of glass or some other transparent material such as a synthetic resin. The plate 48 and a seal ring 49 are pressed against the indicator housing 43 by a locking ring 51. A plurality of circumferentially spaced bolts 52 received in threaded engagement in a suitably threaded annular flange portion 10a of the casing 10 secures the indicator casing 43 in the proper relation with respect to the sensing mechanism.

The upper end of the rotor 14 is closed by means of a plate 53 which is soldered or otherwise secured to the inner wall of the rotor 14. The plate 53 carries a pair of diametrically opposed permanent magnets 54 and 56, and it is the movement of these magnets 54 and 56 which actuates the indicating mechanism. The relative rotational displacement of the rotor 14 with respect to the casing 10 is indicated by the action of the magnets 54 and 56 upon a ferromagnetic pointer 58 centrally disposed within the indicator 43. The actual displacement of the pointer 58 is read against a suitable scale 60 provided on the face of the casing 44 and below the pointer 58.

The structure of the pointer 58 is best illustrated in Figure 4 of the drawings. As seen in that figure, the pointer 58 has a central web portion 59 provided with a central aperture 61. A bridge member 62 has opposed leg portions 63 soldered or welded to the web portion 59 and has a planar portion 64 in parallel spaced relation to the web portion 59. The planar portion 64 is also provided with a central aperture 65 of smaller diameter than the aperture 61, but coaxial therewith.

The pointer 58 is mounted for rotation on a stud 66 in such a way as to provide a multi-point contact between the indicator 58 and its support. The stud has a tapered wall portion 67 against which the web 59 of the indicator 58 is received for rotation. To prevent tilting movement of the pointer 58 about its axis, the bridge member 62 engages a reduced diameter portion 69 of the stud 66 in reasonably close fitting relation, so that the pointer 58 is free to rotate about the stud 66 as an axis, but is prevented from tilting about the stud in a vertical direction. A lock nut 71 may be threaded onto the end of the stud 66 to assist in preventing such tilting movement.

The manner in which the viscosimeter of the present invention operates should be apparent from the foregoing description, but will be briefly summarized. As the oil or other fluid to be tested is introduced into the inlet conduit 26, the viscous drag set up by the motion of the fluid through the annular fluid passageway 24 causes the drum 14 to rotate a predetermined amount depending upon the viscosity characteristics of the fluid. Relative rotational displacement between the drum 14 and the casing 10 is resisted by the action of the torsion spring 31 but only to the extent of providing a controllable, calibrated resistance. The actual displacement of the rotor 14 with respect to the casing 10 is determined by the viscosity properties of the fluid, so that the rotor 14 is displaced to a point where the drag on the rotor provided by the movement of the fluid is equal to the resistance provided by the torsion spring 31. The amount of displacement is indicated by the movement of the pointer 58 under the influence of the permanent magnets 54 and 56. The oil or other fluid being tested is continuously withdrawn through the outlet conduit 27. In the event that the flow of fluid through the device is terminated, the torsion spring 31 acts to return the pointer 58 to its zero position, by virtue of the engagement of the lug 41 on the rotor 14 with the dividing bar 28.

It will be evident that various modifications can be made to the described embodiment without departing from the scope of the present invention.

I claim as my invention:

1. A viscosimeter comprising an outer casing, a rotor within said casing and spaced therefrom to provide an annular fluid passageway between said rotor and said casing, a rotor shaft on said rotor, bearing means in said casing at opposed ends of said shaft supporting said shaft for rotation, said rotor being rotatable relative to said casing solely by the flow of fluid in said passageway, an inlet communicating with said passageway, an outlet communicating with said passageway, a flow dividing bar projecting into said passageway between said inlet and said outlet, a stop on said rotor arranged to abut said bar, a torsion spring on said shaft urging said stop means towards said bar, a pair of diametrically opposed magnets mounted on said rotor, an indicator housing secured to said casing, a stud secured to said indicator housing coaxially with said shaft, a ferromagnetic indicator needle mounted for rotation on said stud, and a bracket secured to said needle and engaging said stud along a surface spaced from the plane of said needle to prevent tilting movement of said needle about said stud.

2. A viscosimeter comprising an outer casing, an inner rotor having an outer periphery spaced from the inner periphery of said casing to provide an annular fluid flow chamber therebetween, bearing means supporting said rotor for rotative movement within said casing, spring means secured to said rotor opposing said rotative movement but permitting angular displacement of said rotor within said casing by the viscous drag of a liquid flowing in said annular fluid flow chamber, an inlet in said outer casing for introducing said liquid continuously into said chamber tangentially to said rotor, an outlet in said outer casing for withdrawing liquid from said chamber tangentially from said rotor, and indicating means for determining the relative displacement of said rotor by the viscous drag of said liquid in flowing from said inlet, through said chamber, and into said outlet.

References Cited in the file of this patent

UNITED STATES PATENTS

| | | |
|---|---|---|
| 775,544 | Rantz et al. | Nov. 22, 1904 |
| 1,746,791 | Osborne | Feb. 11, 1930 |
| 1,911,267 | Danks | May 30, 1933 |
| 1,874,015 | King | Aug. 30, 1937 |
| 2,124,096 | White | July 19, 1938 |
| 2,575,492 | Dittman | Nov. 20, 1951 |

FOREIGN PATENTS

| | | |
|---|---|---|
| 283,732 | Germany | Apr. 22, 1915 |
| 844,362 | Germany | July 21, 1952 |